B. R., C., AND R. S. BOLENBAUGH AND L. W. LONG.
WHEEL CONSTRUCTION.
APPLICATION FILED FEB. 19, 1921.
1,428,468.
Patented Sept. 5, 1922.
2 SHEETS—SHEET 1.
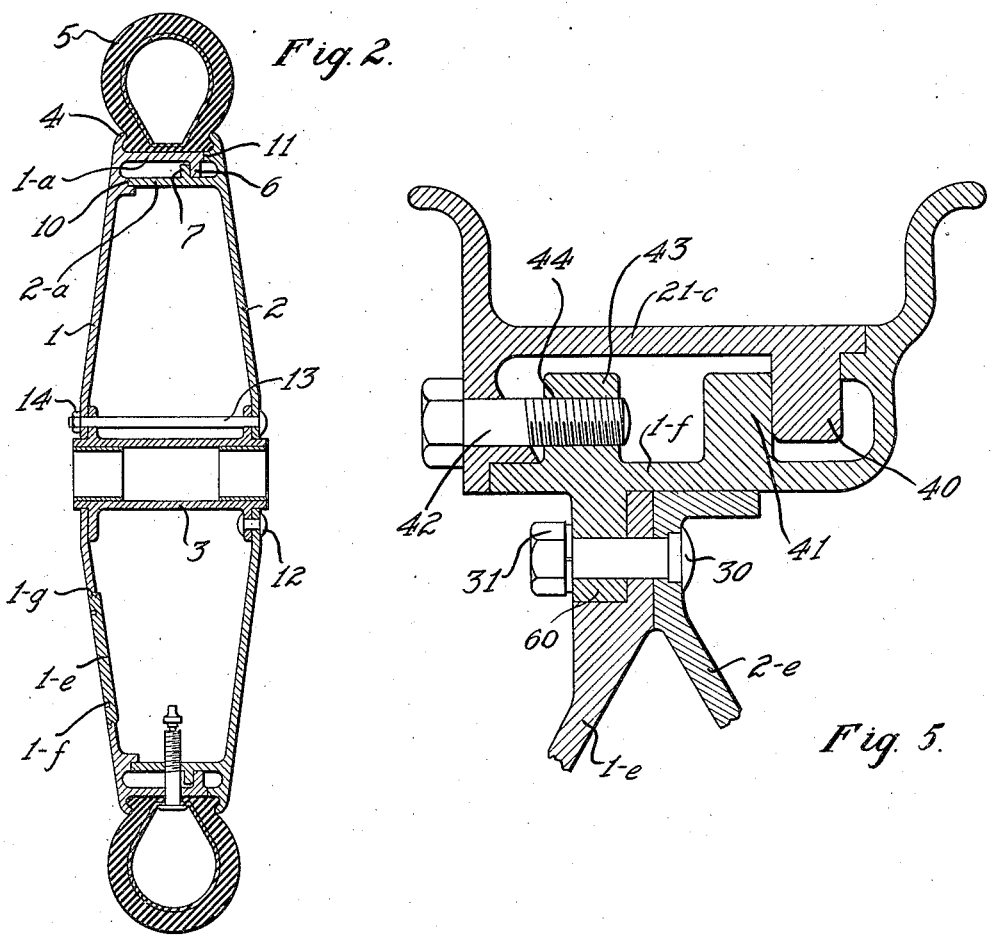
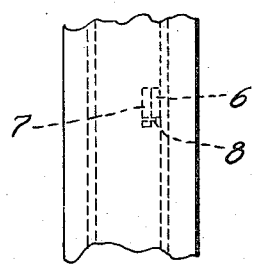
Burton R. Bolenbaugh,
Cyrus Bolenbaugh,
Ray S. Bolenbaugh,
Laurence W. Long.
INVENTORS
BY *Victor J. Evans*
ATTORNEY

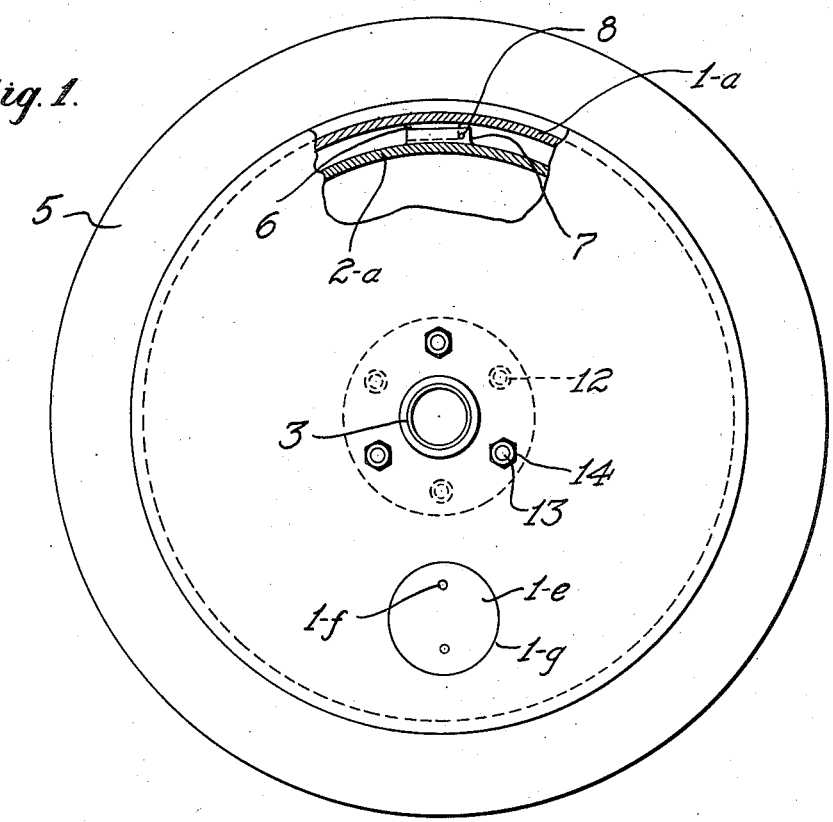
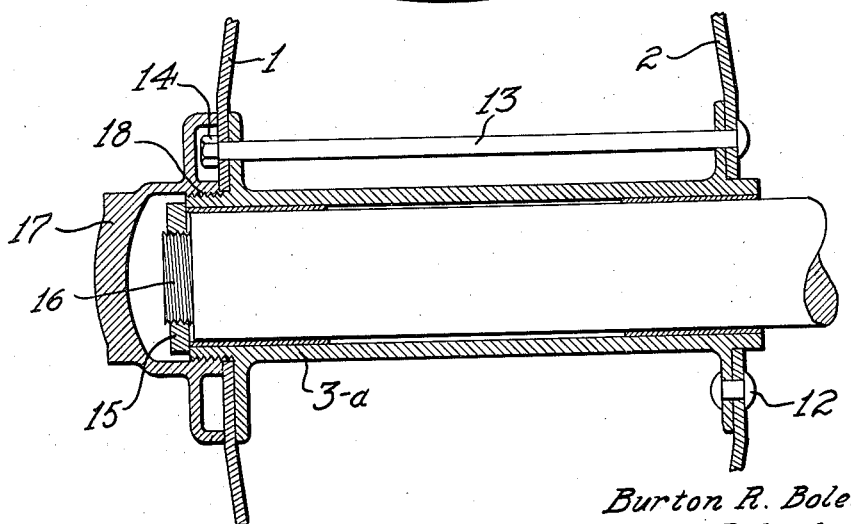

Patented Sept. 5, 1922.

1,428,468

UNITED STATES PATENT OFFICE.

BURTON R. BOLENBAUGH, CYRUS BOLENBAUGH, RAY S. BOLENBAUGH, AND LAURENCE W. LONG, OF JACKSON, MICHIGAN, ASSIGNORS OF ONE-THIRD TO SAID BURTON R. BOLENBAUGH, SAID CYRUS BOLENBAUGH AND SAID RAY S. BOLENBAUGH, ONE-SIXTH TO SAID LONG, ONE-SIXTH TO ARTHUR PAULSON, OF NEW YORK, N. Y., ONE-SIXTH TO HUGH E. KEELER, OF ANN ARBOR, MICHIGAN, AND ONE-SIXTH TO LEWIS H. FLYNN, OF ALBANY, NEW YORK.

WHEEL CONSTRUCTION.

Original application filed October 2, 1920, Serial No. 414,200. Divided and this application filed February 19, 1921. Serial No. 446,491.

*To all whom it may concern:*

Be it known that we, BURTON R. BOLENBAUGH, CYRUS BOLENBAUGH, RAY S. BOLENBAUGH, and LAURENCE W. LONG, citizens of the United States, residing at Jackson, in the county of Jackson and State of Michigan, respectively, have invented new and useful Improvements in Wheel Construction, of which the following is a specification.

In common with the invention constituting the subject matter of our contemporary application filed Oct. 2, 1920, Serial No. 414,200 of which this application is a division, the object of our present joint invention is the provision of a wheel that is a practical improvement over those extant in respect to utility, durability and facility of manipulation.

To the attainment of the foregoing, the invention consists in the improvement as hereinafter described and definitely claimed.

In the accompanying drawings, forming part hereof:—

Figure 1 is a side elevation, partly in section, of one type of wheel constructed in accordance with our invention.

Figure 2 is a diametrical section of the same.

Figure 3 is a fragmentary detail of a portion of the wheel.

Figure 4 is a detail of a modified construction.

Figure 5 is a fragmentary diametrical section of a modification hereinafter explicitly referred to.

Similar numerals designate corresponding parts in Figures 1 to 3 to which reference will first be made.

By comparison of Figures 1 to 3 it will be observed that the wheel includes three major sections that are cast of an appropriate metal or alloy. The said sections are the two disks 1 and 2 and a hub 3. The disks 1 and 2 are equipped at 4 for the retention of a tire 5, and the said disks 1 and 2 are characterized by lugs 6 and 7, respectively, and one of the disks is also provided with a stop pin 8 having a limited movement in the other disk. In forming the wheel the two disks 1 and 2 are placed in opposed or superimposed relation and one of them is turned slightly through a part of a circle so that the locking lugs of one are positioned directly behind the locking lugs of the other. The effect of this is to hold the disks together—i. e., against transverse separation, and so long as the disks 1 and 2 are held together it will be observed that the tire 5 will be securely held to the disks. The lugs 6 of the disk 1 are carried by a lateral flange $1^a$ of the said disk, and the lugs 7 of the disk 2 are carried by a lateral flange $2^a$ on the disk 2, and the stop pin 8 is carried on one of the said flanges to work within the other flange. The flanges $1^a$ and $2^a$ are arranged in radially spaced relation owing to the fact that the flange $2^a$ is of less diameter than the flange $1^a$, and the edge of the flange of each disk bears solidly against the other disk as indicated by 10 and 11 with the result that each disk tends to press against and lend increased stiffness and strength to the other disk. The rear or back disk 2 is held to the hub 3 by means of rivets 12, and the other or front disk 1 may be held to the hub by any appropriate means. For instance in Figures 1 and 2 the disk 1 is held to the hub 3 through the medium of bolts 13 and nuts 14. When deemed expedient, however, the bolts 13 and the nuts 14 may be dispensed with, and the disks 1 and 2 may be held against turning and unlocking through the medium of the means shown in Figure 4, which means includes rivets 12, a hexagonal nut 15 threaded on an axle spindle 16, and a hub cap 17 of bronze or other appropriate metal threaded at 18 on the end of the hub $3^a$ and enclosing the hexagonal nut, the said cap 17 bearing against and frictionally holding the disk remote from the rivets 12. Or if preferred the said means may be employed in association with bolts 13 and nuts 14 as illustrated in Figure 4.

In Figure 5 we illustrate a modification of double disk type, the two disks $1^e$ and $2^e$ being associated with demountable rim sections $1^f$ and $21^c$. The disks $1^e$ and $2^e$ and the rim section $1^f$ are connected together by bolts 30 and nuts 31 thereon, and the rim section 21ᶜ is engaged and connected with the rim section 1ᶠ in the manner illustrated—i. e., by the positioning of lugs 40 on the rim section 21ᶜ back of lugs 41 on the rim section 1ᶠ, and by the threading of a headed bolt 42 carried by the rim section 21ᶜ in a lug 43 carried by the rim section 1ᶠ and provided with a threaded aperture 44 to receive the threaded bolt. The rim sections are provided as shown with laterally extending spaced annular flanges, and on the inner flange is an inwardly extending radial flange 60, the said flange 60 serving to receive bolts such as 30, and being arranged in a vertical plane parallel to the vertical planes of the lugs 40 and 41 so as to contribute to the balance of the wheel when disks such as 1ᶜ and 2ᶜ are connected to the projection.

Having described our invention, what we claim and desire to secure by Letters Patent, is:—

In a wheel structure, the combination of a rim having an inwardly-extending, radial flange disks having outer side by side portions alongside said projection, one of the disk portions rabbetted to receive the said projection and the said other disk portion flanged to bear against the inner surface of the rim, and transverse bolts extending through and connecting the said rim flange and disk portions.

In testimony whereof we affix our signatures.

BURTON R. BOLENBAUGH.
CYRUS BOLENBAUGH.
RAY S. BOLENBAUGH.
LAURENCE W. LONG.